US007290823B2

(12) United States Patent
Kleinmann et al.

(10) Patent No.: US 7,290,823 B2
(45) Date of Patent: Nov. 6, 2007

(54) CLOSING UNIT

(75) Inventors: Michael Kleinmann, Melsbach (DE); Andreas Ritter, Hilgert (DE); Heiko Schilken, Lutzerath (DE)

(73) Assignee: Stabilus GmbH, Koblenz (DE)

( * ) Notice: Subject to any disclaimer, the term of this patent is extended or adjusted under 35 U.S.C. 154(b) by 98 days.

(21) Appl. No.: 10/952,141

(22) Filed: Sep. 28, 2004

(65) Prior Publication Data

US 2005/0121940 A1 Jun. 9, 2005

(30) Foreign Application Priority Data

Oct. 1, 2003 (DE) ................................ 103 45 823
Oct. 6, 2003 (DE) ................................ 103 46 758

(51) Int. Cl.
*B62D 25/10* (2006.01)

(52) U.S. Cl. ....................... 296/76; 296/146.8; 49/324; 49/339

(58) Field of Classification Search .................. 296/76, 296/146.1, 146.8, 56; 49/324, 339, 340, 49/341, 358, 359
See application file for complete search history.

(56) References Cited

U.S. PATENT DOCUMENTS 2,811,348 A 10/1957 Brundage
3,022,108 A 2/1962 Cooley
4,199,177 A * 4/1980 Danzer ....................... 292/144
5,909,921 A 6/1999 Nesbeth
6,181,094 B1 1/2001 Menke
2001/0035725 A1 11/2001 Mintgen et al.
2002/0032986 A1 3/2002 Yuge
2003/0089041 A1 5/2003 Daniels et al.

FOREIGN PATENT DOCUMENTS

| | | |
|---|---|---|
| DE | 41 24 869 | 1/1993 |
| DE | 196 15 021 | 10/1997 |
| DE | 198 44 265 | 4/2000 |
| EP | 1 134 104 | 9/2001 |

OTHER PUBLICATIONS

Office Action dated Apr. 15, 2004 for the corresponding German Application No. 103 46 758.0-23.

* cited by examiner

*Primary Examiner*—Joseph D. Pape
(74) *Attorney, Agent, or Firm*—Cohen Pontani Lieberman & Pavane LLP

(57) ABSTRACT

A closing unit for a flap of a motor vehicle includes at least two hinges which can pivot about a pivot axis between an open position and a closed position; a single drive including a motor, a clutch, and a gear mechanism; and at least two transmission elements extending between the single drive and respective the hinges for pivoting the hinges.

16 Claims, 11 Drawing Sheets

1
4
23
54
46
44
51
8
10
9
41
42
52
22
43
4
45
53
50

CLOSING UNIT

BACKGROUND OF THE INVENTION

1. Field of the Invention

The invention is concerned with a closing unit for a flap, in particular a front or rear flap of a motor vehicle, which can be moved by means of at least two hinges about a pivot axis between an open and a closed position by a drive, which has a driving motor and, in particular, a clutch and a gear mechanism arranged thereon.

2. Description of the Related Art

It is known in one such closing unit for a front or rear flap of a motor vehicle for the closing unit to have an electric motor and a gear mechanism connected to the electric motor. The output shaft of the gear mechanism is connected directly to a member of one of the hinges, so that, with actuation of the driving motor, the hinge member and therefore the flap are moved. A disadvantage of this device is the driving of the flap via a single hinge, since the weight of the flap which is to be moved results in the distortion of the flap together with an associated tilting. An appropriately high-powered motor must hence be used as the driving motor in order to provide sufficient power for moving the flap even if there is tilting. Electric motors of this type require a relatively large amount of installation space. Furthermore, these electric motors are noted for a high power consumption which subjects the electric system of the motor vehicle to a considerable load. In addition, the moments which occur because of the application of force on one side result in increased wear of the hinges.

SUMMARY OF THE INVENTION

It is the object of the invention to provide a closing unit of the type mentioned at the beginning which avoids these disadvantages and, together with a simple construction requiring little installation space, requires only small driving forces to move the flap.

The object is achieved by two hinges each having an actuator which can be pivoted about the pivot axis, wherein the actuators can be driven by a single drive so that they can be moved by means of transmission elements.

The arrangement of the transmission elements makes it possible for a single drive to move the two hinges together, this in turn also permitting a symmetrical input of force. The symmetrical input of force makes it possible to avoid a distortion of the flap and moments caused as a result. In consequence, smaller forces are required for moving the flap, and so use can be made of a lower-powered driving motor. In addition to the lower overall height and the lower costs of a driving motor of this type, the smaller power consumption results in a reduced loading of the power-supply system, this being advantageous in particular when used in a motor vehicle.

Furthermore, the construction of the closing unit permits universal use which is independent of the type of hinges. The hinges may be both single-joint and also multi-joint hinges.

The arrangement of a respective gas-filled spring on the hinges assists the movement of the flap in the opening direction. The gas-filled springs serve primarily to counterbalance the flap.

The driving motor of the closing unit has a compact design if it forms a constructional unit together with the clutch. The constructional unit can therefore be preassembled, as a result of which the installation of the closing unit is simplified.

The use of an electromechanical clutch has proven particularly reliable. This type of clutch permits the use of a switch, the actuation of which enables the closing unit to be activated by the connection of the driving motor to the gear mechanism being produced by means of the clutch. When the clutch is not closed, the flap can be moved manually.

In order to determine the angular velocity and the end positions of the flap, the gear mechanism has an angle sensor. A conclusion can be drawn as to the presence of obstacles from the change in the angular velocity of the flap, in particular a deceleration. In these cases, the movement of the flap by the closing unit is immediately stopped or the flap is moved back into the starting position by reversal of the driving direction. The reversal of the driving direction can take place by changing the direction of rotation of the driving motor by switching over the gear mechanism.

In order to permit manual stopping of the closing unit, the closing unit is connected to the switch or a further pushbutton switch. This enables the movement of the flap to be interrupted before it meets an obstacle.

Both the switch for activating the closing unit and the stopping switch can be connected to the closing unit by means of electric lines or via a radio connection, in accordance with the principle of remote control in a separate operating part, for example in a key.

In one advantageous configuration, a cable sector is arranged on each actuator, the said cable sector being aligned radially with respect to the pivot axis, and the cores of two Bowden cables are guided over its sector circumference, each cable sector being connected to one cable end of the Bowden cables and the Bowden cables being fastened by their other ends to a cable drum, which can be driven rotatably by the drive.

However, it is also possible for a pivot lever which is aligned approximately radially with respect to the pivot axis to be arranged on each actuator, one cable end of the Bowden cables being fastened to each pivot lever at a radial distance from the pivot axis, and the Bowden cables being fastened by their other ends to a cable drum, which can be driven rotatably by the drive.

The arrangement of the Bowden cables on the cable drum and the cable sectors or the pivot levers causes, as a function of the direction of rotation of the cable drum, the cable sectors or pivot levers to be pivoted in one or other direction. The connection to the hinges enables the latter to be pivoted in both directions in order to move the flap. On account of the adaptable length of Bowden cables in conjunction with the free laying options, a closing unit of this type is noted for its great flexibility. The drive with the driving motor, clutch, gear mechanism and the cable drum can be arranged at any desired distance from the hinges. This permits an arrangement of the driving motor at locations with sufficient construction space without having to change existing constructions. The closing unit can therefore be adapted to a very wide variety of conditions of use. In addition, the cable sectors or pivot lever and the Bowden cables are simply constructed components, as a result of which a particularly cost-effective closing unit is produced.

Mounting of the cable sectors or pivot levers on the hinges is avoided if the cable sectors or pivot levers are formed integrally with one actuator in each case of the hinges. On account of the simple structure of the cable sectors or pivot levers, the additional outlay in this case is negligible.

The movement of the cable sectors by the Bowden cables is carried out in a simple manner if one cable end of a Bowden cable is fastened in each case to the two circumferential ends of the cable sectors, and the cores of the Bowden cables are guided in opposite directions over the cable sectors.

The cable sectors have, on their sector circumference, a contour receiving the Bowden cables, in particular the core. As a result, reliable guidance of the Bowden cables on the cable sectors is ensured. The contour turns out to be particularly simple if it comprises two grooves running on the sector circumference, each Bowden cable being received by one groove.

The Bowden cables can be laid together in one direction on one cable sector if one cable end of one Bowden cable is fastened to a first circumferential end of the cable sector while the sheath is arranged on a positionally fixed component, preferably the bodywork in the case of a motor vehicle, in the region of the second circumferential end of the cable sector. The cable end of the other Bowden cable is arranged on the component in the region of the first circumferential end of the cable sector and the sheath is arranged at the second circumferential end of the cable sector. In this configuration, the Bowden cables take up a particularly little amount of construction space.

The Bowden cables can also be laid in one direction if one cable end of one Bowden cable is fastened to the pivot lever at a radial distance from the pivot axis while the sheath of this Bowden cable is arranged on a positionally fixed component, and one cable end of the other Bowden cable is arranged on the positionally fixed component and the sheath is arranged on the pivot lever at a radial distance from the pivot axis.

A contribution is made to further reducing the driving power of the driving motor if the Bowden cables are arranged on the circumference of the cable sectors or on the pivot levers at a distance from the axis of rotation of the flap. The moment which changes during the opening of the flap and with which the flap acts on the hinges is compensated for by a suitable arrangement of the cable sectors by the cable sectors not being arranged vertically but rather at an angle to the vertical. The effect achieved by this configuration is that the required driving moment remains constant over the entire pivoting region of the flap. Changeable driving moments which would lead to increased wear are therefore avoided.

A further configuration involves one end of a tension and compression rod being arranged on each actuator at a radial distance from the pivot axis and its other end being connected to a cable sector which can be pivoted about an axis extending transversely with respect to the pivot axis and the cores of two Bowden cables are guided over its sector circumference, each cable sector being connected to one cable end of the Bowden cables and the Bowden cables being fastened by their other ends to a cable drum, which can be driven rotatably by the drive.

In order to pivot the flap, the Bowden cables which cause a pivoting of the cable sectors are in turn driven via the cable drum. The pivoting movement of the cable sectors is finally transmitted to the actuators of the hinges by means of the tension and compression rods. The use of the tension and compression rods has the advantage that the closing unit up to the cable sectors can be arranged at a distance from the hinges of the flap if there is not sufficient construction space available in the region of the hinges, or for aesthetic reasons.

In order to avoid the closing unit jamming in the region of the tension and compression rods, the latter are connected at their ends in an articulated manner to the actuators and the cable sectors.

The configuration of the tension and compression rods by means of ball-and-socket joints for connection to the actuators and the cable sectors results in a universally usable closing unit, since the ball-and-socket joints no longer necessarily permit an aligned arrangement of the cable sectors with respect to the actuators, but rather a spatially oblique arrangement.

The arrangement and fastening of the Bowden cables on the cable sectors, and the design of the cable sectors are as in the configuration of the cable sectors which are arranged directly on the actuators.

Another configuration is characterized in that a shaft can be driven rotatably by the drive and one pinion is arranged in each case at the ends of the shaft, the pinions being in engagement with one toothed sector in each case and each toothed sector being arranged fixedly on one actuator of the hinges.

In order to pivot the flap, the at least one shaft is driven by the driving motor via the gear mechanism. The pinions arranged at the ends of the shaft pivot the toothed sectors which transmit the pivoting movement to the actuators of the hinges. The use of pinions and toothed sectors permits the transmission of relatively large forces and moments, on the one hand. On the other hand, if the forces and moments which are to be transmitted are smaller, the closing units can be of smaller design, with the result that less construction space is required.

Installation of the toothed sectors on the hinges is avoided if the toothed sectors are formed integrally with the actuators. On account of the simple structure of the toothed sectors, the additional outlay here is negligible. A small design of the toothed sectors is achieved with a configuration, in which the toothed sectors have, on their circumference, a toothed profile, the teeth of which are directed radially outwards.

By contrast, protection of the toothed profiles and of the pinions against damage is achieved with toothed sectors, the teeth of which are directed radially inwards, with the result that the pinions are held by the circumference of the toothed sectors and are therefore covered.

In addition to the drive of the toothed sectors via a single shaft, the drive of each toothed sector by means of a dedicated shaft has been tried and tested. This configuration requires a relatively small outlay particularly on repair work.

A further stepping down of the speed of rotation of the driving motor is achieved with the arrangement of a further gear mechanism between the at least one shaft and the drive. In addition, the gear mechanism permits a relatively large spatial separation of the driving motor and of the hinges.

In this configuration too, the driving power of the driving motor is further reduced if the points at which the pinions engage with the toothed sectors are arranged at a radial distance from the axis of rotation of the flap.

A further configuration is characterized in that one end of a tension and compression rod is arranged on each actuator at a radial distance from the pivot axis and its other end is connected to a toothed sector which can be pivoted about an axis, the toothed sectors being in engagement in each case with a pinion which is arranged at one end of the at least one shaft, which can be driven rotatably by the drive.

In order to pivot the flap, the at least one shaft is driven by the driving motor via the gear mechanism. The pinions arranged at the ends of the shaft pivot the toothed sectors, the pivoting movement thereof being transmitted to the actuators of the hinges by means of the tension and compression rods, this finally bringing about the pivoting of the flap. The use of the tension and compression rods again has the advantage that the closing unit up to the toothed sectors can be arranged spaced apart from the hinges of the flap. In addition, construction space does not need to be kept in the region of the hinges for the closing unit.

The design and arrangement of the toothed sectors, pinions, shafts and the arrangement of a further gear mechanism are as in the configuration of the toothed sectors which are arranged directly on the actuators.

Analogous to the configuration of the tension and compression rods on the cable sectors, the articulated arrangement thereof on the actuators and toothed sectors has the same advantages.

Also in the case of the configuration with toothed sectors, ball-and-socket joints on the tension and compression rods result in a universally usable closing unit on account of the spatially oblique arrangement of the toothed sectors with respect to the actuators which is now possible.

Similarly, the arrangement of the tension and compression rods on the actuators at a distance from the axis of rotation of the flap results in a reduction in the driving power of the driving motor.

A further configuration is characterized in that a shaft can be driven rotatably by the drive and one pinion is arranged in each case at the ends of the shaft, the pinions being in engagement in each case with toothed racks which extend transversely with respect to the pivot axis and are arranged on one actuator in each case of the hinges in a manner such that they can pivot about an axis parallel to the pivot axis.

In order to pivot the flap, the at least one shaft is in turn driven by the driving motor via the gear mechanism. The pinions arranged at the ends of the shaft reach into the teeth of the toothed racks in order thereby to displace the toothed racks and to pivot the actuators. The use of toothed racks likewise permits the transmission of large forces and moments to the actuators in order to move the flap.

For the rotatable arrangement of the toothed racks on the actuators, the said toothed racks are connected to each other by joints.

In order to support the toothed racks so that they are kept in permanent engagement with the pinions of the shaft, the toothed racks can be arranged in a longitudinally displaceable manner in sliding guides which are arranged in particular on the at least one shaft in a manner such that they can pivot about the longitudinal axis of the shaft.

In the configuration with toothed racks, the arrangement of two shafts and of a further gear mechanism and the arrangement of the engagement points of the toothed racks with the pinions at a distance from the axis of rotation of the flap are similarly possible, with the known advantages.

A further configuration is characterized in that a toothed sector is arranged on each actuator, the said toothed sector being aligned radially with respect to the pivot axis and a respective pinion, which is connected coaxially in a rotationally fixed manner to a cable sector or a cable pulley, engages in the said toothed sector, each cable sector or each cable pulley being connected to one cable end of two Bowden cables and the Bowden cables being fastened by their other ends to a cable drum, which can be driven rotatably by the drive.

However, it can be just as advantageous for one end of a tension and compression rod to be arranged on each actuator at a radial distance from the pivot axis, its other end being connected to a toothed sector which can be pivoted about an axis extending transversely with respect to the pivot axis and a pinion, which is connected coaxially in a rotationally fixed manner to a cable sector or a cable pulley, engages in the said toothed sector, each cable sector or each cable pulley being connected to one cable end of two Bowden cables and the Bowden cables being fastened by their other ends to a cable drum, which can be driven rotatably by the drive.

In these configurations, the driving movement of the motor is transmitted via the gear mechanism, the cable drum and the Bowden cables to the cable sectors or cable pulleys which, for their part, are connected to the pinions. The pinions driven in such a manner pivot the toothed sectors, as a result of which the flap is ultimately moved. This configuration uses both the advantages of the drive by means of the Bowden cable and cable sector and the advantages of the drive by means of the pinion and toothed sector.

The connection between a pinion in each case and a cable sector turns out to be particularly compact if the two components are connected integrally to each other.

The further design and arrangement of the Bowden cables, cable sectors, pinions and toothed sectors can take place in accordance with the configurations already described in order to achieve the advantages which can be obtained therewith.

In another configuration, the cable sectors are of cylindrical design. This permits the formation of the contour receiving the Bowden cables over an angular region of more than 360° on the circumference of the cable sectors. If the contour is designed as a groove, it may extend spirally on the circumference. The cable sectors can therefore be formed with a small diameter, so that the closing unit can be of more compact design.

DETAILED DESCRIPTION OF THE PRESENTLY PREFERRED EMBODIMENTS

Figure 1:
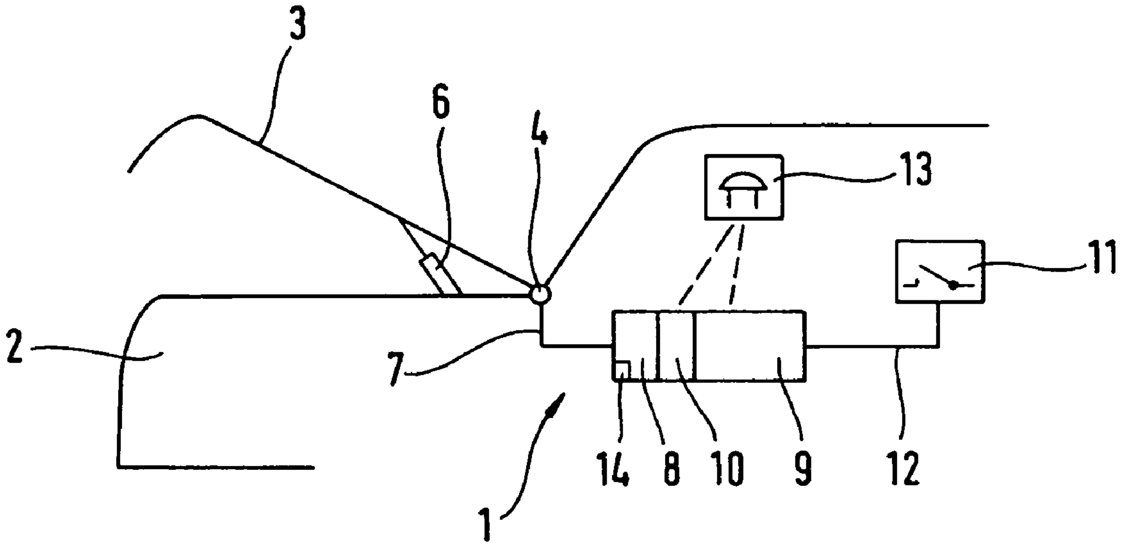
FIG. 1 shows a schematic illustration of a closing unit according to the invention.

The closing unit 1 illustrated in FIG. 1 serves for moving a flap. 3 closing a boot of a motor vehicle 2. The flap 3 is fastened by means of two hinges 4 to the bodywork 5 of the motor vehicle 2 in a manner such that it can be rotated about a pivot axis lying transversely with respect to the longitudinal axis of the vehicle. A gas-filled spring 6 assisting the movement of the flap 3 is arranged on each hinge 4.

In order to pivot the flap 3, the hinges 4 are connected to transmission elements 7 which are driven by a driving motor 9, which is designed as an electric motor, via a gear mechanism 8. The electric motor 9 is connected to the gear mechanism 8 via an electromechanical clutch 10. The activation of the closing unit 1 takes place by a switch 11, which is connected to the closing unit 1 by means of electric lines 12. The clutch 10 then connects the driving motor 9 to the gear mechanism 8. A push-button switch 13 serves for the immediate manual interruption of the movement of the flap 3, for example in the event of encountering an obstacle. The push-button switch 13 is connected to the closing unit 1 via a radio connection. An angle sensor 14 which determines the angular velocity of the flap 3 is arranged in the gear mechanism 8. As a result, the angle sensor 14 is capable of recognizing the end positions of the flap 3. Furthermore, the angle sensor 14 can detect changes in the angular velocity which are caused by an obstacle being encountered during the movement of the flap 3. In these cases, the direction of rotation of the driving motor 9 is immediately reversed, with the result that the flap 3 is moved away from the obstacle.

Figure 2:
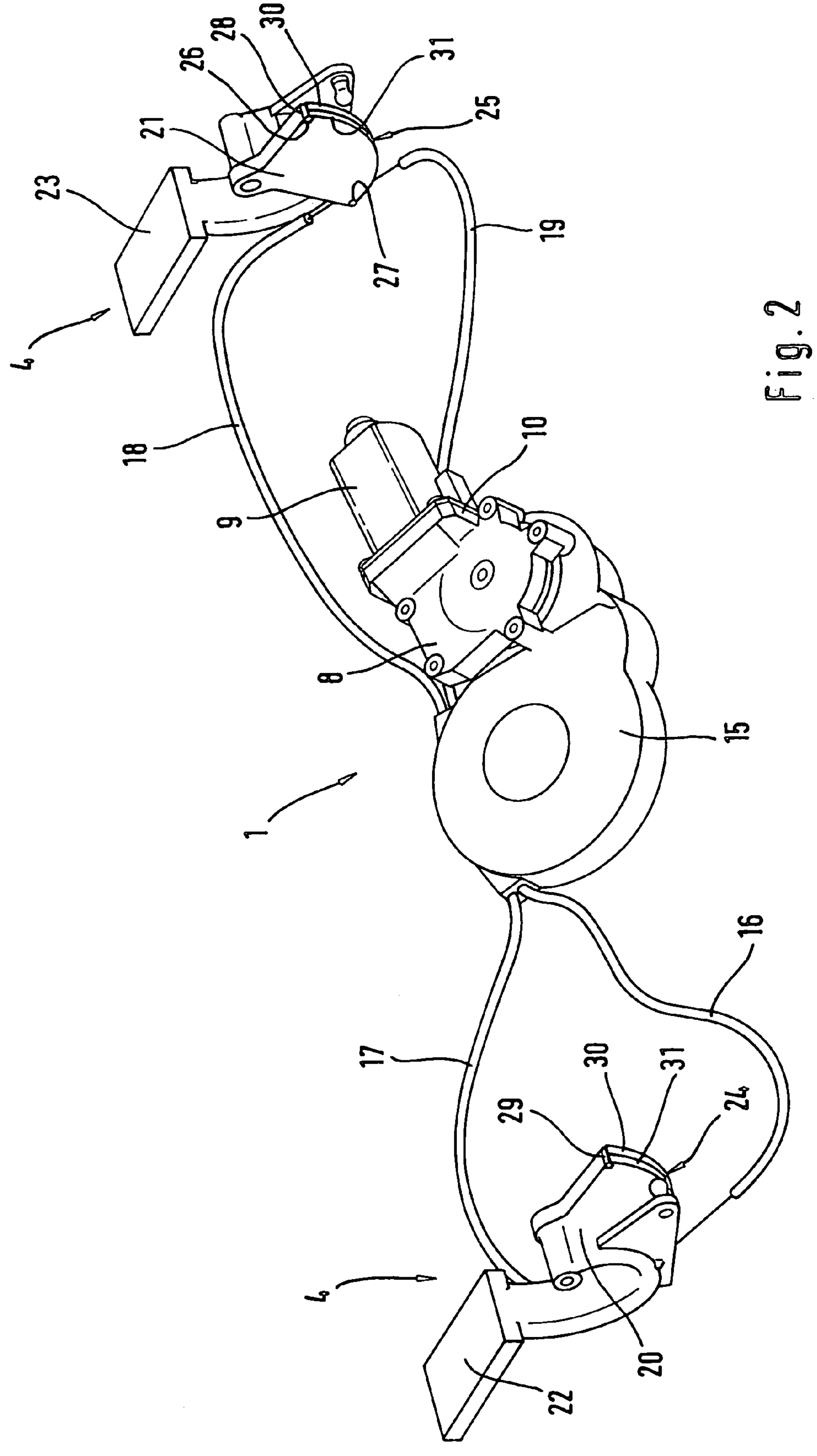
FIG. 2 shows an illustration of a first embodiment of the closing unit with Bowden cables and cable sectors.

FIG. 2 shows the closing unit 1 in a perspective illustration. The driving motor 9 forms a constructional unit with the clutch 10. The gear mechanism 8 is connected to the clutch 10. A cable drum 15 is fastened to the gear mechanism 8. The cable drum 15 serves to receive the ends (not illustrated) of the Bowden cables 16-19. The Bowden cables 16-19 are arranged at their other ends on the cable sectors 20, 21.

The cable sectors 20, 21 are connected integrally with actuators 22, 23 of the hinges 4. The circumference 24, 25 of the cable sectors 20, 21 is bounded by two ends 26, 27. One end of the Bowden cables is fastened to each end, the cable end 28 of the Bowden cable 18 and the cable end 29 of the Bowden cable 17 being visible in FIG. 2. The circumference 24, 25 of the cable sectors 20, 21 is designed with two grooves 30, 31 in each case for receiving the Bowden cables 16-19.

In the position illustrated, the flap (not illustrated) is closed. When the closing unit 1 is activated, the cable drum is driven by the driving motor 9 in such a manner that the cables of the Bowden cables 17, 18 are wound up and the cables of the Bowden cables 16, 19 are unwound. The result of the cables of the Bowden cables 17, 18 being wound up is that the cable ends 29, 28 are pulled, thereby causing the cable sectors 20, 21 to be pivoted in the clockwise direction and the flap to be opened. The unwound cables of the Bowden cables 16, 19 are wound up in the grooves 30, 31 of the cable sectors 20, 21.

The engagement point of the cable ends 28, 29 of the Bowden cables 16-19 is at a clear distance from the axis of rotation of the hinges 4 and therefore from the flap 3. The shape of the cable sectors 20, 21 means that a constant moment is always applied to the hinge 4 irrespective of the particular position.

Figure 3:
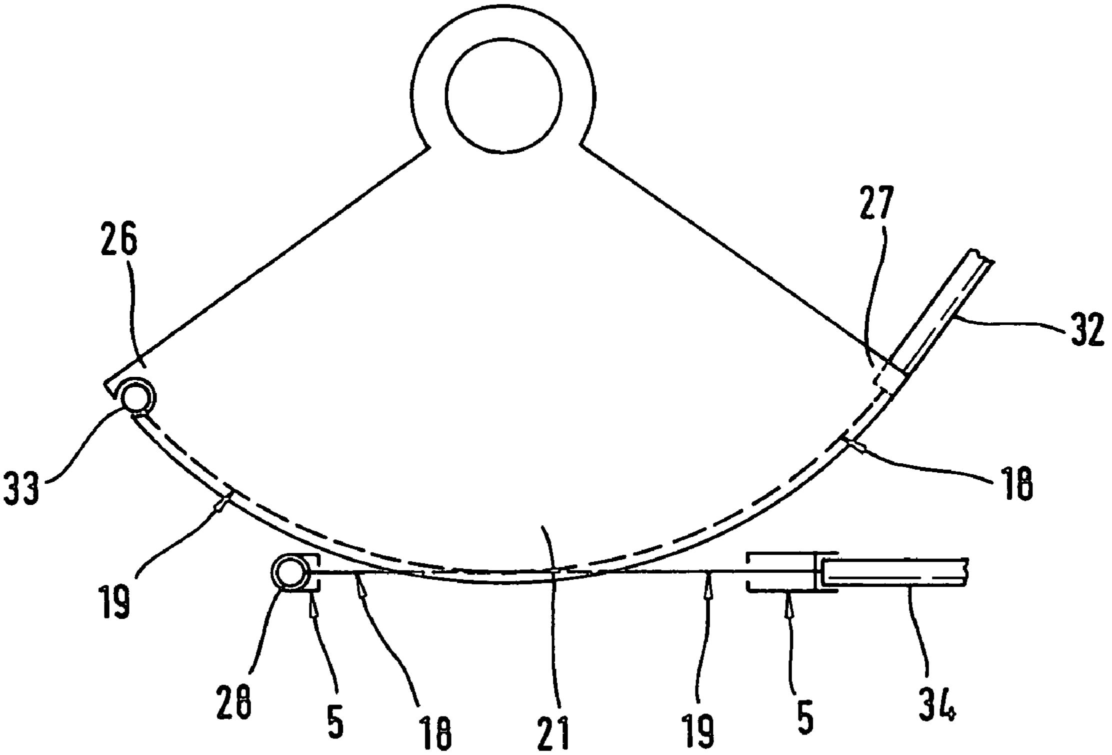
FIG. 3 shows a schematic illustration of a cable sector according to FIG. 2 with the Bowden cable guided in the same direction.

The cable sector 21 in FIG. 3 corresponds in terms of construction to the cable sector illustrated in FIG. 2. In contrast to FIG. 2, the Bowden cables 18, 19 are not guided away in opposite directions, but rather run in a space-saving manner in the same direction. The cable end 28 of the Bowden cable 18 is fastened in the region of the circumferential end 26 to the bodywork 5. The sheath 32 of the Bowden cable 18 is fastened to the circumferential end 27 of the cable sector 21. The cable end 33 of the Bowden cable 19 is fastened to the circumferential end 26 on the cable sector 21 and, by means of the sheath 34, to the bodywork 5 in the region of the circumferential end 27.

In order to pivot the cable sector 21 anticlockwise, the Bowden cable 19 is wound up onto the cable drum (not illustrated). Owing to the fixedly arranged sheath 34, only the cable end 33 can move into the sheath 34, in which case the cable sector is pivoted in the described direction. By contrast, the Bowden cable 18 which is unwound from the cable drum is placed into the groove (not illustrated) on the circumference of the cable sector 21.

Figure 4:
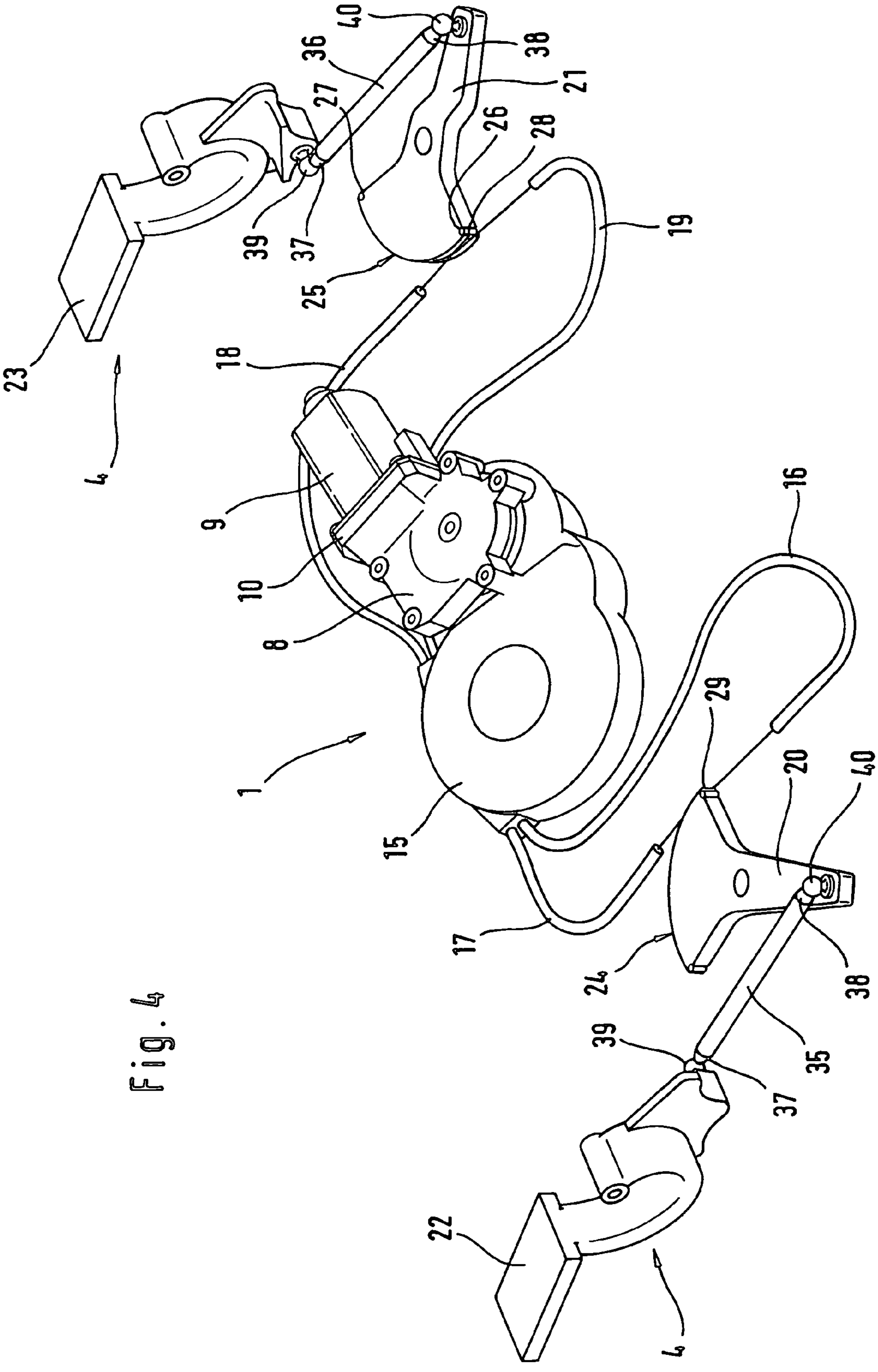
FIG. 4 shows an illustration of a second embodiment of the closing unit with separate cable sectors.

FIG. 4 shows a closing unit 1 which corresponds essentially to the closing unit from FIG. 2. In contrast to FIG. 2, the cable sectors 20, 21 are arranged at a distance from the actuators 22, 23. The cable sectors 20, 21 are connected to the actuators 22, 23 by means of two tension and compression rods 35, 36. The spatially oblique connection via the tension and compression rods 35, 36 is made possible by means of ball-and-socket joints 39, 40 at the ends 37, 38 thereof. With the pivoting of the cable sectors 20, 21, the actuators 22, 23 and therefore the flap (not illustrated) are moved via the tension and compression rods 35, 36.

Figure 5:
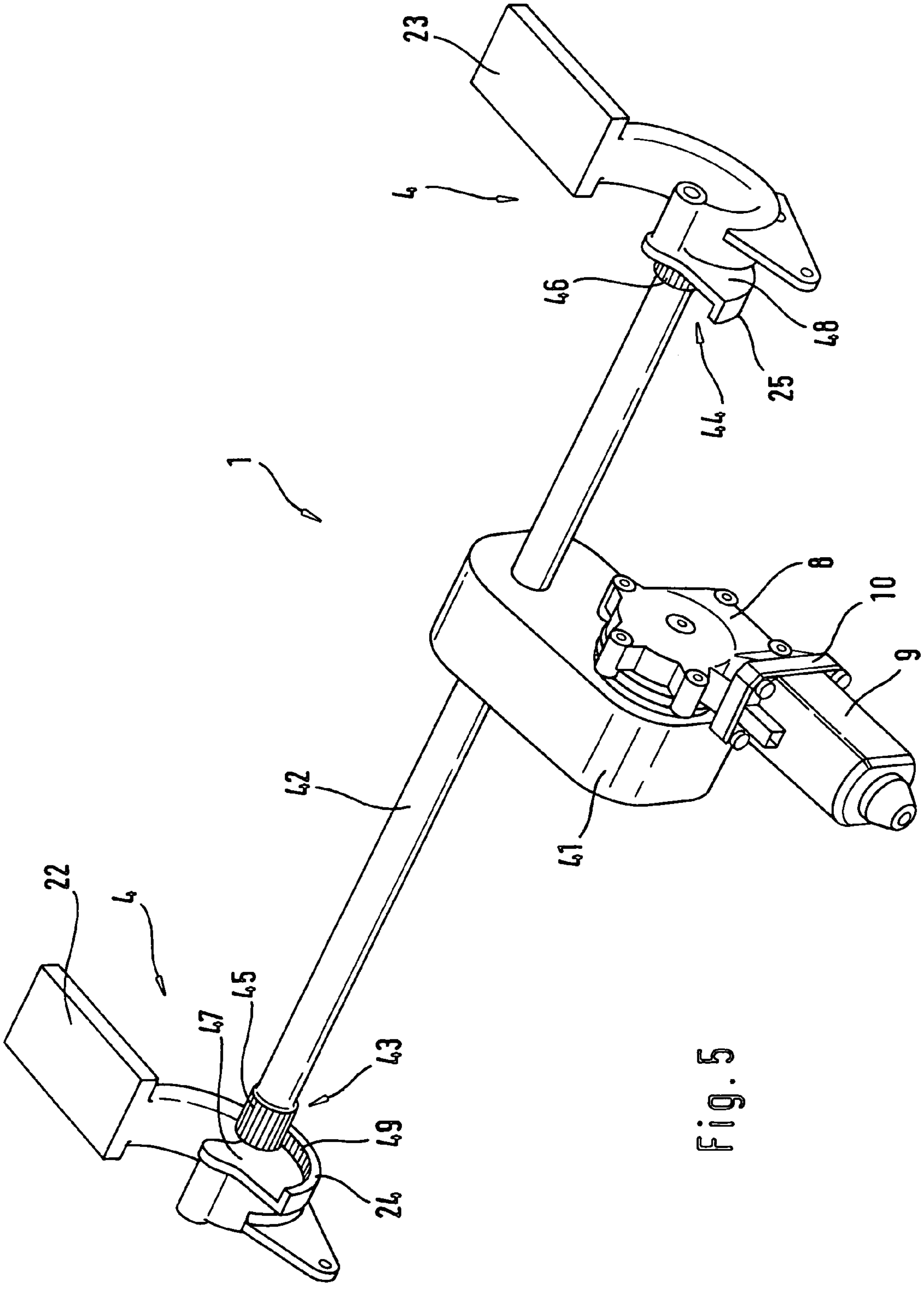
FIG. 5 shows an illustration of a third embodiment of the closing unit with toothed sectors-and pinions.

FIG. 5 shows a closing unit 1 in which a further gear mechanism 41 is flange-mounted on the gear mechanism 8. The gear mechanism 41 drives a shaft 42, at the ends 43, 44 of which pinions 45, 46 (illustrated schematically) are arranged. The pinions 45, 46 are in engagement with toothed sectors 47, 48 which have, on their circumference 24, 25, a toothed profile 49 (illustrated schematically) with radially inwardly pointing teeth. The toothed sectors 47, 48 are connected integrally to the actuators 22, 23.

For movement of the flap (not illustrated) by the actuators 22, 23 of the hinges, the shaft 42 is driven by the driving motor 9. The pinions 45, 46 rotating with the shaft 42 bring about, via engagement in the toothed profile 49, the pivoting of the toothed sectors 47, 48 and therefore of the actuators 22, 23.

Figure 6:
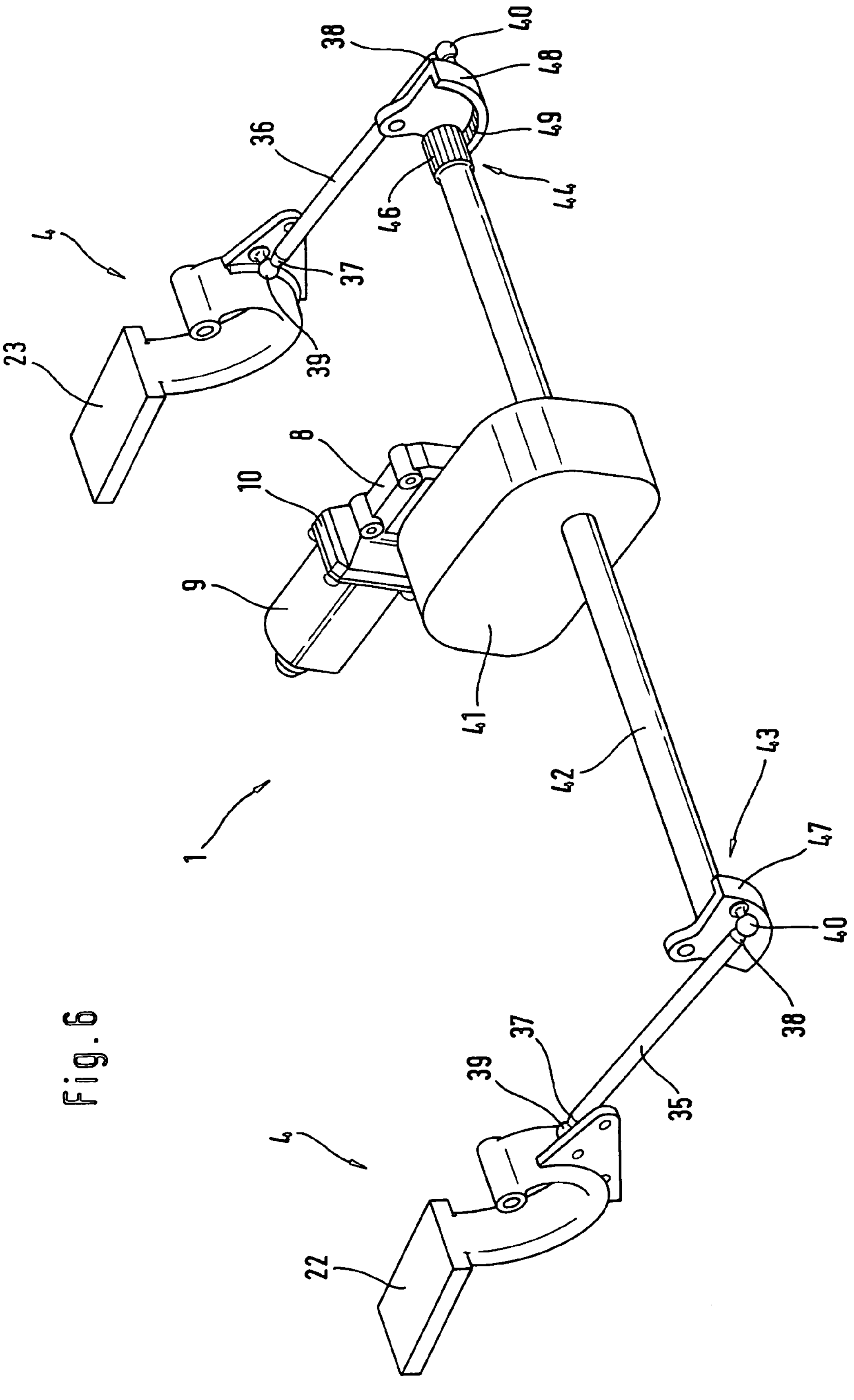
FIG. 6 shows an illustration of a fourth embodiment of the closing unit with separate toothed sectors.

The closing unit 1 in FIG. 6 corresponds in terms of construction, beginning from the driving motor 9 up to the toothed sectors 47, 48, to the closing unit according to FIG. 5. The connection of the toothed sectors 47, 48, which are arranged at a distance from the actuators 22, 23, takes place by means of two tension and compression rods 35, 36, according to FIG. 4, which have, at their ends 37, 38, ball-and-socket joints 39, 40 for the spatially oblique arrangement of the toothed sectors 47, 48 with respect to the actuators 22, 23.

Figure 7:
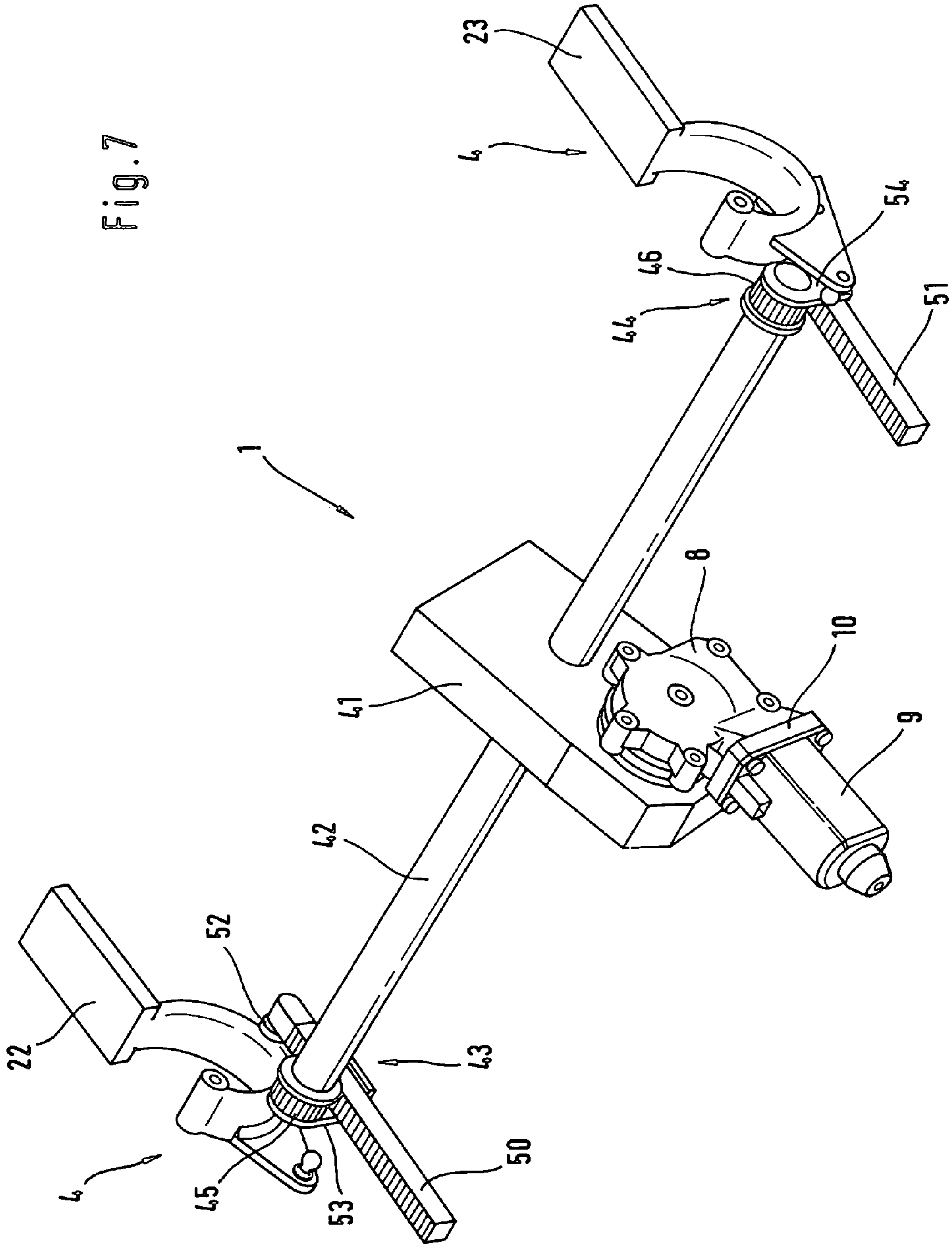
FIG. 7 shows an illustration of a fifth embodiment of the closing unit with toothed racks.

FIG. 7 shows a closing unit 1 which corresponds essentially to the closing unit according to FIG. 5. Instead of the toothed profile, toothed racks 50, 51 (illustrated schematically) which are in engagement with the pinions 45, 46 of the shaft 42 are arranged on the toothed sectors 47, 48. In order to follow the pivoting movement of the toothed sectors 47, 48, the toothed racks 50, 51 are mounted rotatably by means of a respective joint 52.

Sliding guides 53, 54 are fastened to the ends 43, 44 of the shaft 42. The toothed racks 50, 51 are mounted in a longitudinally displaceable manner in the sliding guides 53, 54. The sliding guides 53, 54 ensure that the toothed racks 50, 51 are kept permanently in engagement with the pinions 45, 46. The sliding guides 53, 54 are mounted rotatably.

Figure 8:
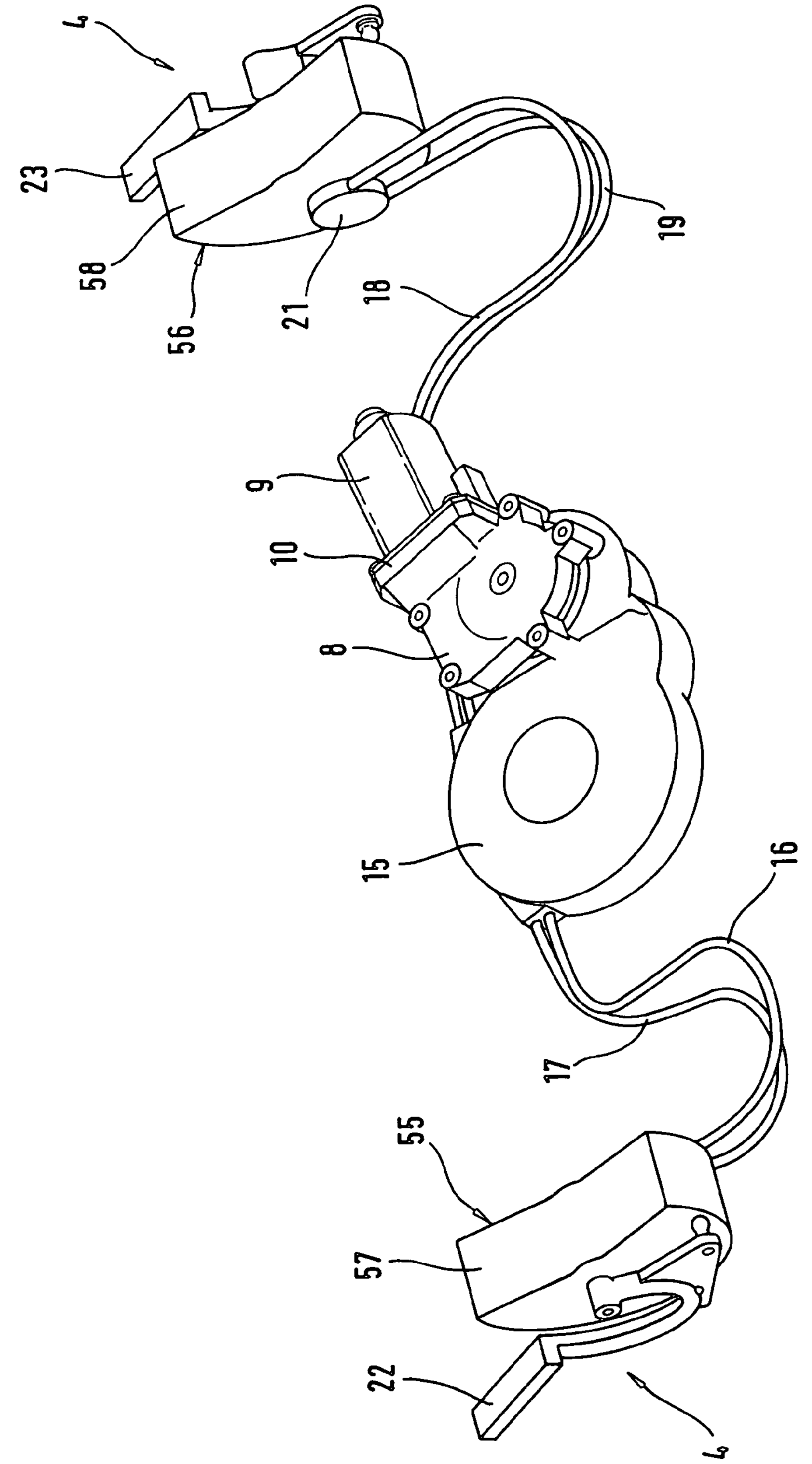
FIG. 8 shows an illustration of a sixth embodiment of the closing unit with cable pulleys and toothed sectors.

The closing unit 1 in FIG. 8 shows a combination of cable pulleys 20, 21 with Bowden cables 16-19 and pinions 45, 46. The pinions 45, 46 and cable pulleys 20, 21 are combined in each case to form a unit 55, 56 which is illustrated in greater detail in FIG. 9 which follows. The units 55, 56 have fixed housings 57, 58 in which the individual components are arranged.

The closing unit corresponds in terms of construction, from the driving motor 9 up to the cable pulleys 20, 21, essentially to the construction according to FIG. 2 while the closing unit 1 with the pinions adjoining the cable pulleys 20, 21 corresponds essentially, up to the connection to the actuators 22, 23, to the construction of the closing unit according to FIG. 5.

Figure 9:
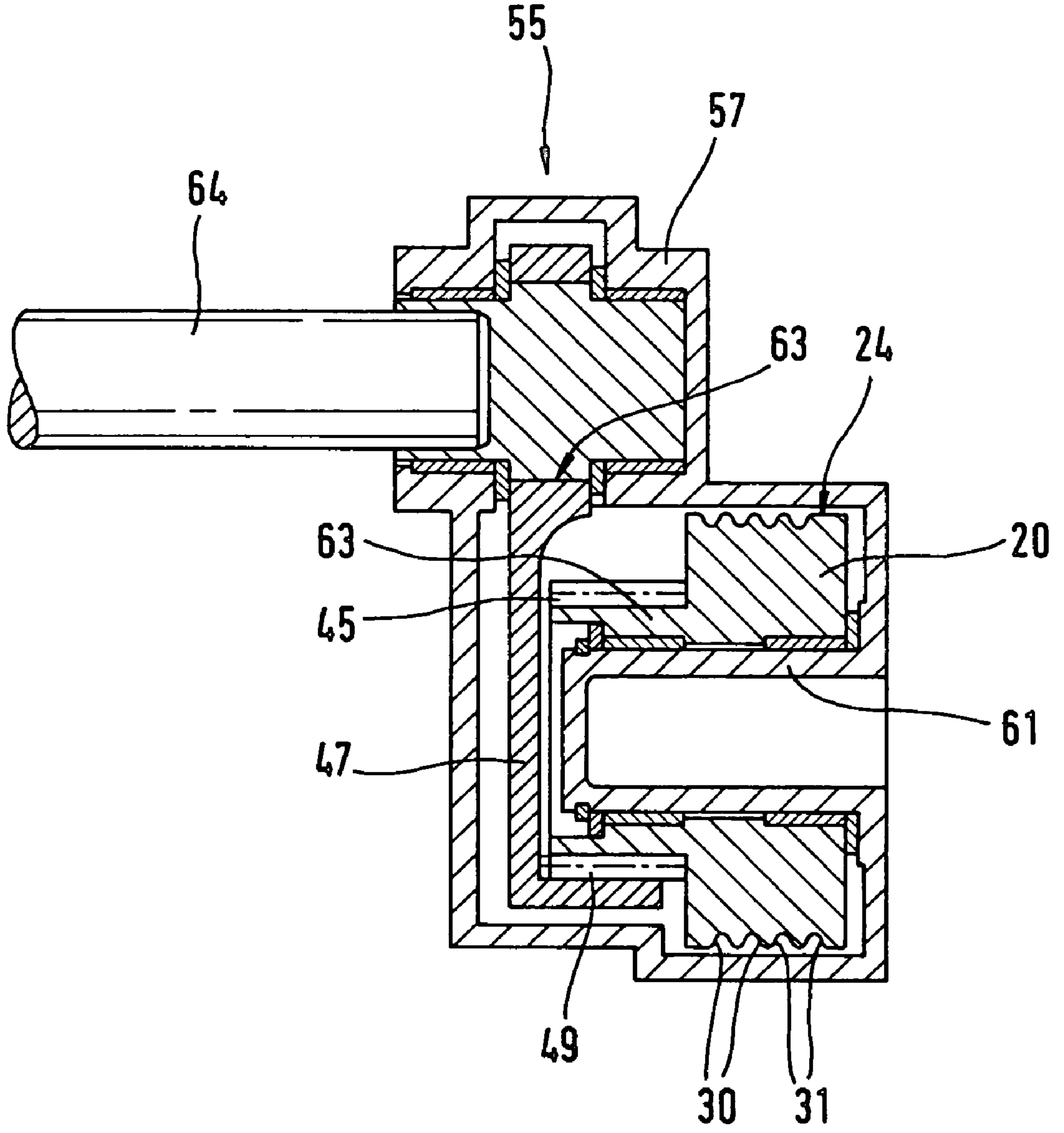
FIG. 9 shows a section through a cable and toothed sector according to FIG. 8.

The unit 55 from FIG. 8 is illustrated in section in FIG. 9. The unit 55 comprises a housing 57, in the lower part of which the cable pulley 20 is arranged. The cable pulley 20 is arranged rotatably on an indentation of the housing 57, which indentation is designed as a positionally fixed axis 61. Grooves 30, 31 on the circumference 24 of the cable pulley 20 serve for the defined support of the Bowden cables (not illustrated). The grooves 30, 31 extend spirally over an angular region of approximately 270°. Owing to the extent of the grooves 30, 31 over such a large angular region, the cable pulley 20 can be designed with a relatively small diameter, with the result that the unit 55 has small dimensions.

The cable pulley 20 has an integrally formed pin 62 which is likewise arranged rotatably on the axis 61. The pin 62 is designed as a pinion 45 which engages in the toothed profile 49 of the toothed sector 47. The toothed sector 47 has a hole 63 in which a shaft 64, which connects the toothed sector 47 to the actuator 22 in a rotationally fixed manner, is rotatably arranged.

When the Bowden cables are driven by the driving motor, the cable pulley 20 is rotated. As a consequence of the rotation of the pinion 45 which is brought about as a result, the toothed sector 47 which moves the actuator 22 together with the flap (not illustrated) via the shaft 64 is pivoted.

Figure 10:
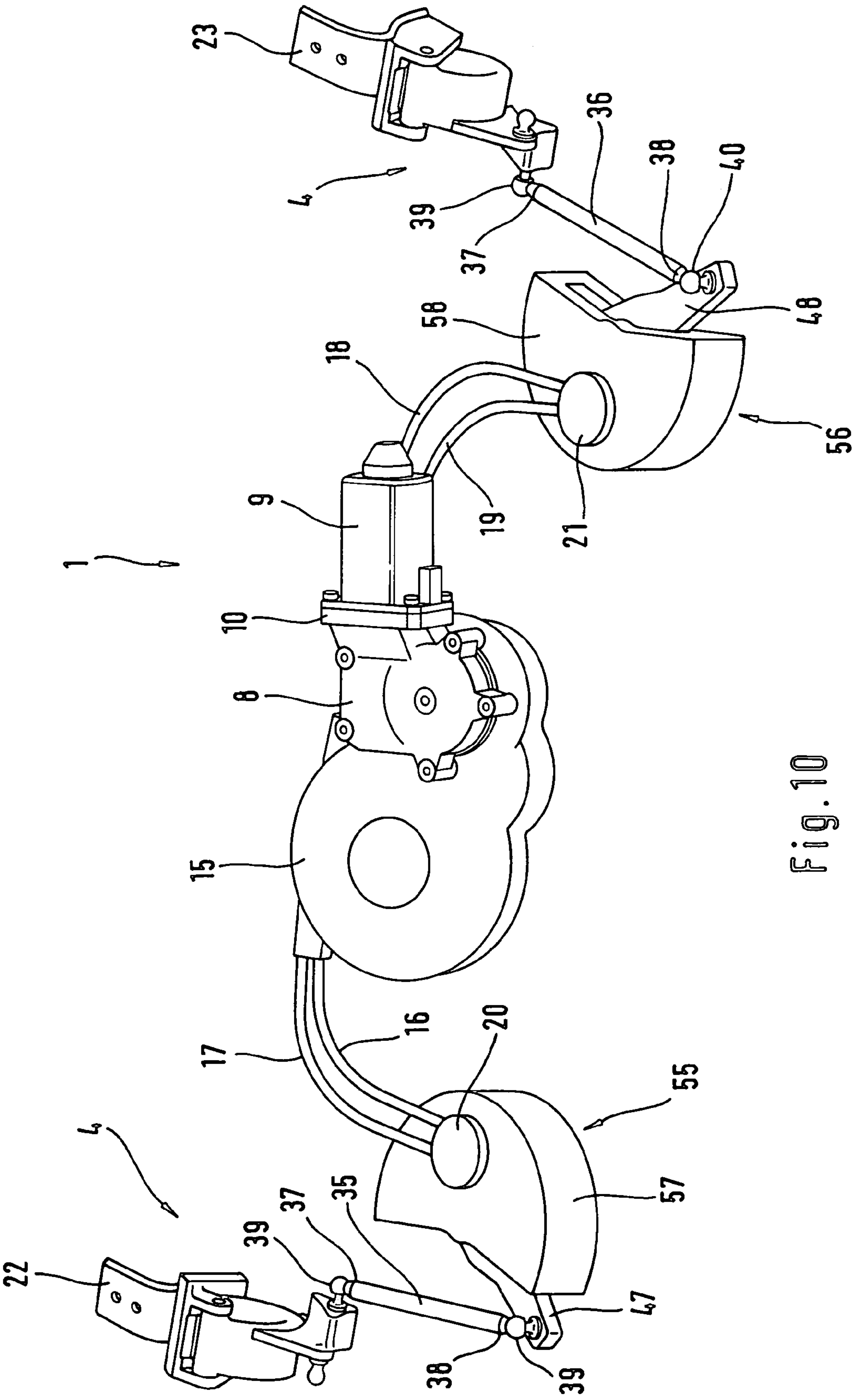
FIG. 10 shows an illustration of a seventh embodiment of the closing unit with cable pulleys and toothed sectors.

In the exemplary embodiment of FIG. 10, the region from the actuator 22, 23 up to the toothed sector 47, 48 corresponds to the exemplary embodiment illustrated in FIG. 4, with it being possible for the toothed sector 47, 48 to be pivoted about an axis extending transversely with respect to the pivot axis.

The further driving path from the toothed sector 47, 48 up to the cable drum 15 in turn corresponds to the design illustrated in FIGS. 8 and 9.

In this exemplary embodiment too, when the Bowden cables are driven by the driving motor, the cable pulley 20 is rotated. As a consequence of the rotation of the pinion 45 brought about as a result, the toothed sector 47 which moves the actuator 22 together with the flap (not illustrated) via the shaft 64 is pivoted.

Figure 11:
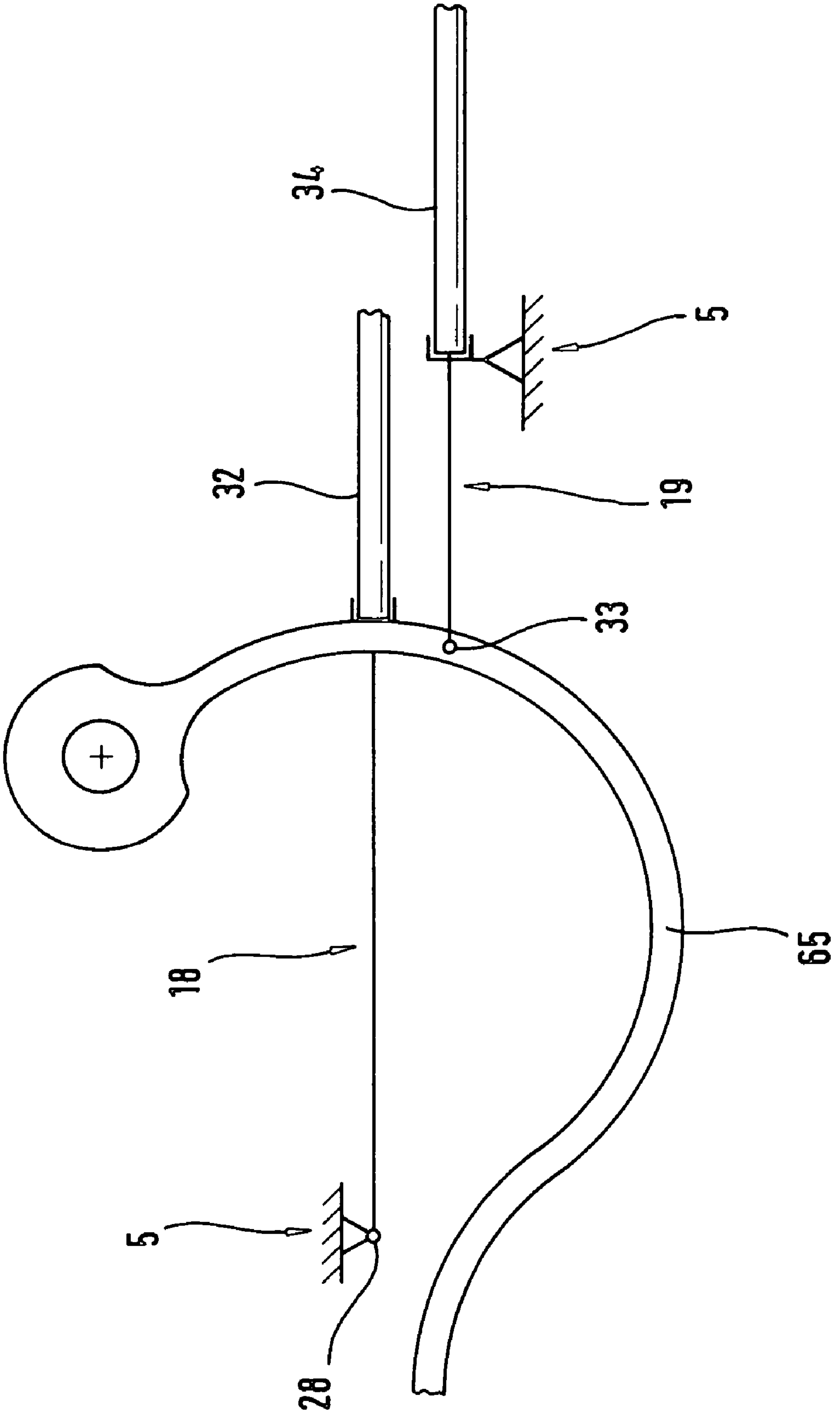
FIG. 11 shows an illustration of an eighth embodiment of the closing unit with Bowden cables and pivot levers.

In the case of the exemplary embodiment of FIG. 11, instead of a cable sector 21 corresponding to FIG. 3, use is made of a pivot lever 65 which may also be used instead of the cable sector in FIG. 2. In contrast to FIG. 2, the Bowden cables 18, 19 are not guided away in opposite directions, but rather run in a space-saving manner in the same direction. The cable end 28 of the Bowden cable 18 is fastened to the bodywork 5. The sheath 32 of the Bowden cable 18 is fastened to the pivot lever 65 at a radial distance from the pivot axis. The cable end 33 of the Bowden cable 19 is fastened to the pivot lever 65 at a radial distance from the pivot axis and the sheath 34 is fastened to the bodywork 5.

In order to pivot the pivot lever 65 anticlockwise, the Bowden cable 19 is wound up onto the cable drum (not illustrated). Owing to the fixedly arranged sheath 34, only the cable end 33 can move into the sheath 34, in which case the pivot lever 65 is pivoted in the described direction. The sheath 32 of the Bowden cable 18 unwound from the cable drum is moved in the process by the pivot lever 65. In order to pivot the pivot lever 65 in the clockwise direction, the Bowden cable 18 is wound up onto the cable drum, the sheath 32 moving the pivot lever 65 in the clockwise direction and the cable end 33 of the Bowden cable 19 being pulled into the sheath 34.

The invention claimed is:

1. A closing unit for a flap of a motor vehicle, the closing unit comprising:
 - at least two hinges which can pivot about a pivot axis between an open position and a closed position;
 - a single drive comprising a motor, a clutch, and a gear mechanism; and
 - at least two transmission elements extending between said single drive and respective said hinges for pivoting said hinges.

2. The closing unit of claim 1 wherein each said hinge comprises a cable sector having a circumferential surface, said single drive further comprising a cable drum, the transmission elements comprising Bowden cables having cores which are guided over said circumferential surfaces, each core having one end connected to a cable sector and an opposite end connected to the cable drum.

3. The closing unit of claim 2 wherein each said circumferential surface has two opposed circumferential ends, said transmission elements comprising a pair of Bowden cables connected to each said cable sector, each pair having cores which are guided in opposite directions over the circumferential surface of each said cable sector, each core having an end connected to a respective circumferential end of a respective said cable sector.

4. The closing unit of claim 3 wherein each said circumferential surface comprises a pair of grooves for receiving respective said cores.

5. The closing unit of claim 2 wherein each said circumferential surface has opposed circumferential ends, said transmission elements comprising a pair of Bowden cables connected to each said cable sector, one cable of each said pair having a core with an end which is connected to one circumferential end of a respective said cable sector, the other cable of each said pair having a core with an end attached to the cable sector adjacent to said one circumferential end and a sheath which is arranged on a fixed component adjacent to the other circumferential end.

6. The closing unit of claim 1 wherein each said hinge comprises a pivot lever, said single drive further comprising a cable drum, the transmission elements comprising Bowden cables having cores, each core having one end connected to a pivot lever and an opposite end connected to the cable drum.

7. The closing unit of claim 6 wherein said transmission elements comprise a pair of Bowden cables connected to each said pivot lever, one Bowden cable of each pair having a core connected to the pivot lever and a sheath connected to a positionally fixed component, the other Bowden cable of each pair having an end connected to a positionally fixed component and a sheath connected to the pivot lever.

8. The closing unit of claim 1 wherein said transmission elements comprise:
 - a pair of cable sectors which can be pivoted about pivot axes extending transversely of the pivot axis of the hinges, each said cable sector having a circumferential surface;
 - a pair of rods connecting respective said cable sectors to respective said hinges, each said rod having an articulated connection to a respective said hinge and an articulated connection to a respective said cable sector; and
 - a pair of Bowden cables having cores which are guided over said circumferential surfaces, each core having one end connected to a cable sector and an opposite end connected to the cable drum.

9. The closing unit of claim 1 wherein each said hinge comprises a toothed sector, said transmission elements comprising at least one shaft driven by said drive, said at least one shaft having a pair of opposed ends provided with pinions which engage respective said toothed sectors.

10. The closing unit of claim 1 further comprising:

a pair of toothed sectors which can be pivoted about an axis; and a pair of rods connecting said sectors to respective said hinges, each said rod having an articulated connection to a respective said hinge and an articulated connection to a respective said toothed sector;

wherein said transmission elements comprise at least one shaft, said at least one shaft having a pair of opposed ends provided with pinions which engage respective said toothed sectors.

11. The closing unit of claim 1 further comprising a pair of toothed racks which extend transversely of said pivot axis, each said rack being pivotably connected to a respective said hinge, said transmission elements comprising at least one shaft, said at least one shaft having a pair of opposed ends provided with pinions which engage respective said toothed racks.

12. The closing unit of claim 11 further comprising sliding guides pivotably mounted on the ends of the at least one shaft, said racks moving through said sliding guides as said shafts are driven in rotation.

13. The closing unit of claim 1 wherein each said hinge comprises a toothed sector, said single drive further comprising a cable drum, said transmission elements comprising:

a pair of pinions engaging respective said toothed sectors;

a pair of cable sectors or cable pulleys which are fixed against rotation with respect to respective said pinions, each said cable sector or cable pulley having a circumferential surface; and a pair of Bowden cables having cores which are guided over said circumferential surfaces, each core having one end connected to said cable sector or cable pulley and an opposite end connected to the cable drum.

14. The closing unit of claim 1 wherein said single drive further comprises a cable drum, said transmission elements comprising:

a pair of toothed sectors which can be pivoted about pivot axes extending transversely of the pivot axis of the hinges a pair of rods connecting respective said toothed sectors to respective said hinges, each said rod having an articulated connection to a respective said hinge and an articulated connection to a respective said toothed sector;

a pair of pinions engaging respective said toothed sectors;

a pair of cable sectors or cable pulleys which are fixed against rotation with respect to respective said pinions, each said cable sector or cable pulley having a circumferential surface; and a pair of Bowden cables having cores which are guided over said circumferential surfaces, each core having one end connected to said cable sector and an opposite end connected to the cable drum.

15. The closing unit of claim 14 wherein said transmission elements comprise a pair of Bowden cables connected to each said cable sector, each pair of Bowden cables having cores which are guided in opposite directions over the circumferential surface.

16. The closing unit of claim 14 wherein each said circumferential surface has opposed circumferential ends, said transmission elements comprising a pair of Bowden cables connected to each said cable sector, one cable of each said pair having a core with an end which is connected to one circumferential end of a respective said cable sector, the other cable of each said pair having a core with an end attached to the cable sector adjacent to said one circumferential end and a sheath which is arranged on a fixed component adjacent to the other circumferential end.

* * * * *